(12) United States Patent
Elwakil

(10) Patent No.: US 6,478,862 B1
(45) Date of Patent: Nov. 12, 2002

(54) PIGMENTED INKS AND A METHOD OF MAKING PIGMENTED INKS

(75) Inventor: Hamdy A. Elwakil, Chanhassen, MN (US)

(73) Assignee: MacDermid Acumen, Inc., Waterbury, CT (US)

( * ) Notice: Subject to any disclaimer, the term of this patent is extended or adjusted under 35 U.S.C. 154(b) by 0 days.

(21) Appl. No.: 09/524,872

(22) Filed: Mar. 14, 2000

(51) Int. Cl.$^7$ ................................................ C09D 11/02
(52) U.S. Cl. ................ 106/31.6; 106/31.86; 106/31.75; 106/31.76; 106/31.78; 106/31.87
(58) Field of Search ............................ 106/31.6, 31.86, 106/31.75, 31.76, 31.87, 31.78

(56) References Cited

U.S. PATENT DOCUMENTS

| | | | |
|---|---|---|---|
| 3,903,034 A | 9/1975 | Zabiak | 260/29.6 WB |
| 4,170,482 A | 10/1979 | Mansukhani | 106/20 |
| 4,196,006 A | 4/1980 | Mansukhani | 106/22 |
| 4,243,994 A | 1/1981 | Kobayashi et al. | 346/140 R |
| 4,290,072 A | 9/1981 | Mansukhani | 346/1.1 |
| 4,471,079 A | 9/1984 | Enami | 523/161 |
| 4,545,818 A | 10/1985 | Inoue et al. | 106/22 |
| 4,585,815 A | 4/1986 | Ono et al. | 524/23 |
| 4,683,002 A | 7/1987 | Mirua et al. | 106/20 |
| 4,689,078 A | 8/1987 | Koike et al. | 106/22 |
| 4,785,313 A | 11/1988 | Higuma et al. | 346/135.1 |
| 4,789,399 A | 12/1988 | Williams et al. | 106/20 |
| 4,910,084 A | 3/1990 | Yamasaki et al. | 428/411.1 |
| 4,914,562 A | 4/1990 | Abe et al. | 346/140 R |
| 4,959,661 A | 9/1990 | Buxton et al. | 346/1.1 |
| 4,965,609 A | 10/1990 | Tomida et al. | 346/1.1 |
| 4,978,969 A | 12/1990 | Chieng | 346/1.1 |
| 4,990,186 A | 2/1991 | Jones et al. | 106/22 |
| 5,006,172 A | 4/1991 | Chieng et al. | 106/22 |
| 5,026,427 A | 6/1991 | Mitchell et al. | 106/23 |
| 5,053,079 A | 10/1991 | Haxell et al. | 106/31 |
| 5,066,332 A | 11/1991 | Brown et al. | 106/31 |
| 5,098,478 A | 3/1992 | Krishnan et al. | 106/23 |
| 5,100,468 A | 3/1992 | Yuasa et al. | 106/20 |
| 5,100,471 A | 3/1992 | Winnik et al. | 106/23 C |
| 5,100,969 A | 3/1992 | Yamamoto et al. | 525/327.2 |
| 5,106,417 A | 4/1992 | Hauser et al. | 106/20 |
| 5,114,477 A | 5/1992 | Mort et al. | 106/20 |
| 5,122,814 A | 6/1992 | Endo et al. | 346/33 R |
| 5,143,546 A | 9/1992 | Yuasa et al. | 106/20 |
| 5,156,675 A | 10/1992 | Breton et al. | 106/22 |
| 5,165,968 A | 11/1992 | Johnson et al. | 427/288 |
| 5,167,703 A | 12/1992 | Elda et al. | 106/22 K |
| 5,172,133 A | 12/1992 | Suga et al. | 346/1.1 |
| 5,173,111 A | 12/1992 | Krishnan et al. | 106/20 R |
| 5,180,425 A | 1/1993 | Matrick et al. | 106/22 R |
| 5,184,148 A | 2/1993 | Suga et al. | 346/1.1 |
| 5,187,229 A | 2/1993 | Yamamoto et al. | 525/123 |
| 5,190,581 A | 3/1993 | Fukushima et al. | 106/20 D |
| 5,194,475 A | 3/1993 | Kruse et al. | 524/308 |
| 5,203,913 A | 4/1993 | Yamamoto et al. | 106/22 B |
| 5,211,747 A | 5/1993 | Breton et al. | 106/20 R |
| 5,221,332 A | 6/1993 | Kohlmeier | 106/20 C |
| 5,223,026 A | 6/1993 | Schwarz, Jr. | 106/20 D |
| 5,226,957 A | 7/1993 | Wickramanayake et al. | 106/25 R |
| 5,229,786 A | 7/1993 | Suga et al. | 346/1.1 |
| 5,242,489 A | 9/1993 | Schwarz, Jr. | 106/20 D |
| 5,281,261 A | 1/1994 | Lin | 106/20 R |
| 5,286,286 A | 2/1994 | Winnik et al. | 106/20 A |
| 5,296,022 A | 3/1994 | Kobayashi et al. | 106/20 D |
| 5,316,575 A | 5/1994 | Lent et al. | 106/20 R |
| 5,324,349 A | 6/1994 | Sano et al. | 106/25 R |
| 5,328,504 A | 7/1994 | Ohnishi | 106/20 D |
| 5,342,440 A | 8/1994 | Wickramanayake | 106/22 R |
| 5,345,254 A | 9/1994 | Wong et al. | 347/100 |
| 5,370,731 A | 12/1994 | Yamashita et al. | 106/22 H |
| 5,376,169 A | 12/1994 | Hotomi et al. | 106/23 C |
| 5,378,574 A | 1/1995 | Winnik et al. | 430/115 |
| 5,380,358 A | 1/1995 | Aoki et al. | 106/20 R |
| 5,389,132 A | 2/1995 | Davulcu et al. | 106/20 R |
| 5,395,431 A | 3/1995 | Siddiqui et al. | 106/20 R |
| 5,415,686 A | 5/1995 | Kurabayashi et al. | 106/26 R |
| 5,417,747 A | 5/1995 | Arata et al. | 106/20 D |
| 5,429,841 A | 7/1995 | Batlaw et al. | 427/288 |
| 5,439,517 A | 8/1995 | Yoshida et al. | 106/22 K |
| 5,441,561 A | 8/1995 | Chujo et al. | 106/20 C |
| 5,443,628 A | 8/1995 | Loria et al. | 106/20 C |
| 5,462,590 A | 10/1995 | Yui et al. | 106/20 R |
| 5,466,287 A | 11/1995 | Lyon | 106/20 R |
| 5,478,382 A | 12/1995 | Miller et al. | 106/22 B |
| 5,484,475 A | 1/1996 | Breton et al. | 106/20 C |
| 5,498,282 A | 3/1996 | Miller et al. | 106/22 B |
| 5,500,040 A | 3/1996 | Fujinami | 106/21 A |
| 5,503,664 A | 4/1996 | Sano et al. | 106/20 R |
| 5,510,397 A | 4/1996 | Okuda et al. | 523/161 |
| 5,512,089 A | 4/1996 | Thakkar | 106/20 R |
| 5,514,207 A | 5/1996 | Fague | 106/20 D |
| 5,529,617 A | 6/1996 | Yamashita et al. | 106/20 R |
| 5,531,818 A | 7/1996 | Lin et al. | 106/23 C |

(List continued on next page.)

FOREIGN PATENT DOCUMENTS

| | | | |
|---|---|---|---|
| EP | 0 826 752 A2 | 3/1997 | C09D/11/00 |
| EP | 0 869 160 A2 | 10/1998 | C09D/11/00 |
| WO | WO 98/06789 | 2/1998 | C09D/11/02 |

OTHER PUBLICATIONS

US 5,123,959, 6/1992, Fukushima et al. (withdrawn)
Gamma–Butyrolactone, Chemical Intermediates, Technical Data Sheet, Feb. 1997.

*Primary Examiner*—Helene Klemanski
*Assistant Examiner*—Veronica F. Faison
(74) *Attorney, Agent, or Firm*—Carmody & Torrance LLP

(57) ABSTRACT

A method of making an ink jet ink that entails combining a water miscible organic solvent, water, and a pigment dispersion, and blending the water miscible organic solvent, the water, and the pigment dispersion together to form the ink jet ink, wherein the ink jet ink is capable of exhibiting no pigment precipitation, no pigment agglomeration, and no pigment flocculation after being stored in the absence of any agitation for a period of at least about 1 month.

14 Claims, No Drawings

U.S. PATENT DOCUMENTS

| | | | |
|---|---|---|---|
| 5,549,740 A | 8/1996 | Takahashi et al. | 106/20 R |
| 5,575,843 A | 11/1996 | Krishnan et al. | 106/402 |
| 5,596,027 A | 1/1997 | Mead et al. | 523/161 |
| 5,604,276 A | 2/1997 | Suga | 524/100 |
| 5,606,356 A | 2/1997 | Noguchi et al. | 347/100 |
| 5,658,376 A * | 8/1997 | Noguchi et al. | 106/31.43 |
| 5,667,569 A | 9/1997 | Fujioka | 106/31.58 |
| 5,667,572 A | 9/1997 | Taniguchi et al. | 106/31.36 |
| 5,690,721 A | 11/1997 | Itoh | 106/31.13 |
| 5,700,851 A | 12/1997 | Banning et al. | 523/161 |
| 5,707,432 A | 1/1998 | Adams et al. | 106/31.6 |
| 5,709,737 A | 1/1998 | Malhotra et al. | 106/31.43 |
| 5,746,817 A | 5/1998 | Katsen et al. | 106/31.65 |
| 5,746,818 A * | 5/1998 | Yatake | 106/31.86 |
| 5,760,257 A | 6/1998 | Tanaka et al. | 554/36 |
| 5,803,958 A | 9/1998 | Katsen et al. | 106/31.65 |
| 5,837,754 A | 11/1998 | Shimomura et al. | 523/161 |
| 5,847,028 A | 12/1998 | Iwase et al. | 523/414 |
| 5,851,273 A | 12/1998 | Morris et al. | 106/31.27 |
| 5,854,307 A | 12/1998 | Kimura et al. | 523/161 |
| 5,876,491 A * | 3/1999 | Gunn et al. | 106/31.46 |
| 5,876,492 A | 3/1999 | Malhotra et al. | 106/31.58 |
| 5,882,389 A | 3/1999 | Schwarz, Jr. | 106/31.49 |
| 5,948,155 A * | 9/1999 | Yui et al. | 106/31.58 |
| 5,954,866 A | 9/1999 | Ohta et al. | 106/31.89 |
| 5,969,003 A * | 10/1999 | Foucher et al. | 106/31.27 |
| 6,033,463 A * | 3/2000 | Yui et al. | 106/31.27 |
| 6,077,339 A * | 6/2000 | Nyssen et al. | 106/31.77 |
| 6,113,680 A * | 9/2000 | Aoyama et al. | 106/31.65 |
| 6,153,001 A * | 11/2000 | Suzuki et al. | 106/31.65 |
| 6,261,353 B1 * | 7/2001 | Doi et al. | 106/31.6 |
| 6,284,029 B1 * | 9/2001 | Sano et al. | 106/31.6 |
| 6,290,762 B1 * | 9/2001 | Elwakil | 106/31.27 |
| 6,368,397 B1 * | 4/2002 | Ichizawa et al. | 106/31.65 |

* cited by examiner

PIGMENTED INKS AND A METHOD OF MAKING PIGMENTED INKS

CROSS-REFERENCE TO RELATED APPLICATION(S)

NONE

BACKGROUND OF THE INVENTION

The present invention generally relates to a thermal ink jet printer ink. More specifically, the present invention relates to a thermal ink jet printer ink that may incorporate a pigment dispersion. The present invention further relates to a pigmented, thermal ink jet printer ink with a long shelf life.

Thermal ink jet printing is a commonly used method of recording images on recording material, such as paper or cloth, by discharging discrete droplets of ink from nozzles of a print head and allowing these droplets to be absorbed by the recording material. Thermal ink jet recording offers opportunities for quiet, high speed, full color printing. Also, images printed with thermal ink jet printers seldom need to be fixed or treated after the ink droplets are absorbed on the recording material.

Thermal ink-jet printing is a non-impact printing process in which ink droplets are formed and thereafter deposited on a print medium in a particular order to form an image on the print medium. The low cost and high quality of the printed output in combination with the relatively noise-free operation of ink jet printers have made ink jet printing a popular and economical alternative to other types of printing in consumer, office, and industrial settings.

Thermal ink-jet printing is one example of a drop-on-demand form of non-impact printing. Other examples of drop-on-demand systems, besides thermal ink jet, are piezoelectric ink jet, acoustic ink jet, and vibrating ink jet systems. Besides drop-on-demand systems, there are also continuous stream ink jet printing systems. In continuous stream ink jet systems, ink is emitted in a continuous stream under pressure through at least one orifice or nozzle. The steam of ink is then broken up into droplets at a fixed distance from the orifice, and the ink droplets are thereafter directed toward the recording medium or recycled into the printing ink supply.

In drop-on-demand systems, an ink droplet is not formed or expelled from the print head unless the droplet is to be placed on the recording medium. Therefore, since drop-on-demand systems require no ink recovery or post-ejection treatment, drop-on-demand systems are typically somewhat simpler in construction and operation than continuous stream ink jet printing systems. Thermal ink jet (sometimes referred to as "bubble jet") systems are one of the most common types of drop-on-demand ink jet printing systems.

In thermal ink jet printing, the energy for drop formation and ejection is generated by electrically heated resistor elements. The resistor elements heat up rapidly in response to electrical signals from a microprocessor to create a vapor bubble. Superheating of the ink far above the normal boiling point of the ink causes the bubble formation. The expansion of the bubble forces a droplet of ink out of a nozzle at a high rate of speed toward the recording medium. After the collapse of the bubble, the ink channel proximate the resistor element refills by capillary action.

Colorants for inks printed by thermal ink jet printing may be generally classified as dyes or pigments. Accordingly, thermal ink jet printer inks may incorporate dye(s), pigment(s), or a combination of dye(s) and pigment(s) to print images on the recording media. Of these three, dye-based thermal ink jet printer ink compositions are most widely available commercially.

One reason that dyes are sometimes selected over pigments concerns the expansive color gamuts and color vibrancy that combinations of different, separately-applied, dye-based thermal ink jet inks typically achieve via process printing, as compared to combinations of conventional pigment-based inks that are separately applied via process printing. Also, the mechanics of printing dye-based inks via thermal ink jet are often simpler than those of printing pigment-based inks since pigments often constitute relatively large particles, as opposed to the molecules of dyes. These particles of pigment may influence the mechanism of drop formation and consequently may enhance the difficulty of achieving good printing performance, such as optimum drop size (drop volume), velocity, and trajectory, as compared to thermal ink jet inks that are based upon molecule-size dyes. Finally, owing to the particle form of pigments, there is a tendency for the pigments of pigmented inks, such as thermal ink jet ink, to sediment, agglomerate, and/or flocculate if the pigments are not properly dispersed in the suspension medium of the ink over the long term. Dyes, as compared to pigments, do not typically exhibit this tendency toward sedimentation, agglomeration, and/or flocculation since dyes are typically in the form of molecules, as opposed to particles.

However, despite these advantages of dye-based inks, there is motivation to use pigments instead of dyes in printing inks. For example, pigments typically exhibit enhanced light fastness characteristics, as compared to dyes. More specifically, printed images formed from thermal ink jet printing inks are often more resistant to color degradation and fading upon exposure to various types of light, such as ultraviolet light, as compared to dyes. Also, pigment-based inks are typically more water resistant than dye-based inks, since many dyes are water soluble to some extent. Furthermore, in many potential new markets for thermal ink jet printing, pigment has traditionally been used as the colorant in printing inks. For example, in the graphic arts industry, the printing systems that are predominantly relied upon, such as lithographic printing, screen printing, gravure printing, flexographic printing, and offset printing, typically employ pigmented inks, as opposed to dye-based inks. Consequently, due to the familiarity of these potential new markets with pigmented inks, any attempt to penetrate these new markets with thermal ink jet printing would benefit from incorporating pigmented ink.

Much development work has focused on pigmented thermal ink jet inks over the past decade or so. Many approaches have focused on preparation of thermal ink jet inks using increasingly sophisticated proprietary pigments. Other attempts have been made to enhance dispersion of pigments in ink using increasingly sophisticated compounds. Though these attempts have added to the store of knowledge concerning pigmented thermal ink jet inks, problems still remain. For example, despite these attempts to enhance dispersion of pigments in ink, no one has found an inexpensive way to maintain uniform dispersion of pigments in thermal ink jet inks over longer periods of time, such as about a month, about six months, about one year, or even about two years or longer. Indeed, pigment particle settling, agglomeration, and/or flocculation, within as little as a few hours or days of manufacture, are prevalent among commercially available pigmented thermal ink jet inks, including even expensive pigmented thermal ink jet inks that are based upon sophisticated proprietary pigments and/or sophisticated dispersion agents.

Corresponding to the increasingly sophisticated and propriety nature of pigments and pigment dispersants, the cost of preparing pigment-based thermal ink jet printer ink has skyrocketed. These sophisticated pigments and pigment dispersants are only available at a high cost, due to the research and development costs that led to creation of these sophisticated pigments and pigment dispersants and/or due to the costly processing and/or mechanical equipment required to prepare these sophisticated pigments and pigment dispersants. Consequently, retail purchase prices for pigmented thermal ink jet inks are often as high as about $300 per pound, or more, depending upon the sophistication of the pigment and pigment dispersant.

On the other hand, in the graphic arts industry, retail purchase prices for inks used in lithographic printing, screen printing, gravure printing, flexographic printing, and offset printing typically are as low as about $5 per pound, or less. Thus, retail purchase prices for prior pigmented thermal ink jet inks are as much as about 60 times greater than the retail purchase prices for inks currently used in the graphic arts industry. Clearly, despite any cost advantages of thermal ink jet printing equipment itself, the cost of pigmented thermal ink jet ink will need to drop dramatically before new markets for thermal ink jet printing, such as the graphic arts industry, show much interest in thermal ink jet printing.

Though pigmented thermal ink jet inks should include pigment particles that remain uniformly dispersed in the ink for longer periods of time, such as a month, a year, or even two years or longer, such stability conflicts with other desirable properties of pigmented thermal ink jet inks. For example, pigmented thermal ink jet ink will preferably be capable of easy application to the recording media as small, discrete droplets that are capable of bonding to the recording media as uniform dots. Should a uniform and stable dispersion of the pigment in the pigmented thermal ink jet ink exist, interaction of properties of the pigment with properties of the dispersion medium of the ink will be responsible for the uniform and stable dispersion of the pigment in the pigmented thermal ink jet ink.

However, by virtue of heating the pigmented thermal ink jet ink with the resistor elements and subsequently ejecting the heated pigmented thermal ink jet ink from the printer nozzle, some of the dispersion medium of the ink will be evaporated during the thermal ink jet printing process. More of the dispersion medium will typically be evaporated from the pigmented thermal ink jet ink as droplets of the pigmented thermal ink jet ink contact and bond with the recording medium. Thus, during the printing process, the interaction of properties of the pigment with properties of the dispersion medium of the ink that are responsible for the uniform and stable dispersion of the pigment in the pigmented thermal ink jet ink will be disturbed, which would be expected to diminish, or even destroy, the uniform distribution of the pigment in the printed droplets of the ink, and consequently the formation of uniform ink dots on the recording media.

Thus, what is needed to maintain the uniform and stable dispersion of the pigment in the pigmented thermal ink jet ink (i.e.: the interaction of properties of the pigment with properties of the dispersion medium of the ink) prior to printing would be expected to hinder formation of uniform ink dots and uniform distribution of pigment in the printed ink dots. Consequently, these competing variables of uniform and stable dispersion of the pigment in the pigmented thermal ink jet ink along with formation of uniform ink dots and uniform distribution of pigment in the printed ink dots are inherently inconsistent with each other and present complex competing variable problems.

Dyes have also enjoyed an advantage over pigments due to the ability of a particular dye set with a predetermined number of dyes to often attain a greater percentage of a particular color gamut than a particular pigment set with the same predetermined number of pigments. One particular color gamut of interest is the color gamut of the PANTONE MATCHING SYSTEM® color matching system. The PANTONE MATCHING SYSTEM® color matching system is one of the most popular color matching systems in the printing industry, especially in the United States.

Traditionally, the printing industry has relied upon a set of inks in different colors that are applied by process printing. The process printing ink sets may have been based upon inks that included dyes, pigments, or a combination of dyes and pigments. An image created using process printing will typically not exactly match a targeted color from the color gamut of the PANTONE MATCHING SYSTEM® color matching system because of differences between process printing and the method of printing used to define the color gamut of the PANTONE MATCHING SYSTEM® color matching system. Specifically, the color gamut of the PANTONE MATCHING SYSTEM® color matching system is based upon spot coloring which entails mixing combinations of different colored inks to form a single ink of a particular color that is thereafter applied to a recording medium to characterize one discrete color of the color gamut. Spot coloring of additional single color inks based upon different combinations of different colored inks proceeds to fill out and define the color gamut of the PANTONE MATCHING SYSTEM® color matching system. On the other hand, in process printing, the different colored inks of the ink sets are applied individually, by process printing, as subtractive color layers on the recording medium, instead of mixing the different colored inks prior to application to the recording medium.

This difference in application technique between process printing (applying different colored inks separately) versus spot coloring (mixing different colored inks prior to application) typically prevents process printing from exactly matching a predetermined, particular color from a particular color gamut, such as the color gamut of the PANTONE MATCHING SYSTEM® color matching system. Also, due to a variety of factors, such as differing ink absorbencies between different substrates, differing interactions of the same inks between different substrates, and non-uniformities of the same ink between applications to different substrates, inks applied by process printing that seemingly should have the same color actually exhibit a different color depending upon which substrate the ink is applied to. Furthermore, due to the aforementioned ink non-uniformities, process printing of the same ink to identical copies of the same substrate at different times often causes the printed ink to exhibit different colors on the identical copies of the same substrate. Nonetheless, process printing offers advantages over spot coloring, since spot coloring has traditionally been prohibitively expensive for printing jobs where the printed image will need to exhibit more than about one to three different colors.

Traditionally, four-color process printing (sometimes referred to as CMYK printing) that relies upon a cyan-colored ink, a magenta-colored ink, a yellow-colored ink, and a black ink has been the most common form of process printing. One example of a commercially available four-color process printing model that relies upon pigment-based inks is the PANTONE® process color model. However, the PANTONE® process color model suffers from a major drawback.

Specifically, the PANTONE® process color model is only capable of attaining about 50% of the color gamut of the PANTONE MATCHING SYSTEM® color matching system. An evolution from four-color process printing is six-color process printing which relies upon six different process colors, rather than four different process colors. One example of a commercially available six-color process printing model that relies upon pigment-based inks is the PANTONE HEXACHROME® process color model. While the six-color PANTONE HEXACHROME® process color model does represent an improvement over the four-color PANTONE® process color model, the six-color PANTONE HEXACHROME® process color model is still only able to attain about 90% of the color gamut of the PANTONE MATCHING SYSTEM® color matching system. Furthermore, both the four color PANTONE® process color model and the six color PANTONE HEXACHROME® process color model suffer from the dual shortcomings of poor color repeatability when printed on different substrates and poor color repeatability when printed at different times on identical copies of the same substrate.

A need exists for a pigmented thermal ink jet printing ink that may be incorporated, in different colors, as part of a set of different colored printing inks for process printing. Pigmented inks offer definite advantages over dye-based inks, such as superior light fastness and superior water resistance. Furthermore, the graphic arts industry traditionally relies upon pigmented inks. However, since the graphic arts industry relies upon printing techniques that are more cumbersome and less efficient than thermal ink jet printing, an advance in pigmented thermal ink jet printing ink is needed that will encourage the graphic arts industry to embrace thermal ink jet printing while retaining the noted benefits of pigmented inks.

First, the complexity and cost of manufacturing pigmented thermal ink jet printing inks must be reduced to be more in line with the cost of printing inks traditionally used in the graphic arts industry. Also, pigmented thermal ink jet printing inks must be made more stable against sedimentation, agglomeration, and/or flocculation while retaining good drop formation attributes and good printing characteristics. Finally, a system of printing with pigmented thermal inkjet printing inks is needed that repeatably attains color gamuts, such as the color gamut of the PANTONE MATCHING SYSTEM® color matching system, no matter the substrate and no matter when the printing occurs. These requirements are met by the pigmented thermal ink jet printing inks of the present invention and the system of the present invention that employs sets of the inventive pigmented thermal ink jet printing inks for thermal ink jet printing.

BRIEF DESCRIPTION OF THE INVENTION

The present invention includes a method of making an ink jet ink The method entails combining a water miscible organic solvent, water, and a pigment dispersion, and blending the water miscible organic solvent, the water, and the pigment dispersion together to form the ink jet ink. The ink jet ink produced by this method is capable of exhibiting no pigment precipitation, no pigment agglomeration, and no pigment flocculation after being stored in the absence of any agitation for a period of at least about 1 month. The present invention further includes a method of forming a printed image on a recording medium and a thermal ink jet ink.

DETAILED DESCRIPTION OF THE PREFERRED EMBODIMENTS

The present invention generally concerns a technique for preparing pigmented ink jet inks for use in thermal ink jet printers using inexpensive, rather than costly and sophisticated, ink components. Nonetheless, despite using these inexpensive components, the inventor has unexpectedly discovered that the inventive thermal ink jet printer ink produces printed results and supports printer operations that are at least equal to that of thermal ink jet printer inks produced using more costly, sophisticated components. These results are especially unexpected, considering that the ink jet printing industry has uniformly focused on research and development of more sophisticated and costly ingredients for purposes of enhancing thermal ink jet printer operations and thermal ink jet printing results.

The ink of the present invention is beneficially media-independent. More specifically, a particular ink of the present invention that is identically applied to two different substrates appears visually to have the identical color, despite differences between the substrates. This is an unheralded advance over the inability of prior pigmented thermal ink jet inks to achieve identical colors, visually, when a particular prior pigmented ink is identically applied to two different substrates. This beneficial property of the inventive ink is believed to be due, in substantial part, to maintenance of uniform pigment dispersion in the ink from start to finish—that is, from initial production, through any storage, through jetting via thermal ink jet printer, and through application and bonding to the recording media. The uniform pigment dispersion in the inventive ink is attributable to the formulation and pigment selection for the inventive ink. Surprisingly, uniform pigment dispersion in the inventive ink is achieved using relatively inexpensive components that are combined using simple equipment via a very simple mixing procedure.

The ink of the present invention includes, at a minimum, water, a water miscible organic solvent, and pigment. The pigment may be provided as part of a pigment dispersion. The pigment dispersion that may be incorporated as part of the ink of the present invention includes both a pigment and a liquid carrier, or dispersion medium, for the pigment. The pigment dispersion is typically obtained from a commercial source in prepared form, though the pigment dispersion may be prepared by combining pigment with an appropriate liquid carrier. Some examples of suitable, commercially available, pigment dispersions include the YWD-1155 yellow pigment dispersion, the YJD-3174 yellow pigment dispersion, the BJD-3115 blue pigment dispersion, the QJD-3122 red pigment dispersion, and the QWD-0108 magenta pigment dispersion that are each available from Sun Chemical Corporation of Amelia, Ohio; the B2G blue pigment dispersion that is available from Clarion Corporation of Coventry, Rhode Island; and the CAB-O-JET™ 300 black colorant that is available from Cabot Corporation of Boston, Mass.

The pigment particles that are included in the inks of the present invention preferably have a nominal particle size of about 0.2 microns or less to enhance the excellent transparency of the inventive inks. To ensure that the pigment particles have the preferred nominal size when the ink is printed, it is recommended that the ink be filtered through a 0.45 micron polytetrafluroethylene (PTFE) filter paper prior to placing the ink in the printing device, such as a thermal ink jet printer.

Some non-exhaustive examples of the water miscible organic solvent of the ink of the present invention include alkyl alcohols having one to five carbons, such as methanol, ethanol, n-propanol, isopropanol, n-butyl alcohol, sec-butyl alcohol, tert-butyl alcohol, isobutanol, n-pentanol, etc.; amides, such as dimethylformamide, dimethylacetamide, etc.; cyclic amines, such as 4-piperidine ethanol, N-methyl-4-piperidinol, 2-pyrrolidinone, 1-methyl-2-pyrrolidinone (sometimes referred to as NMP), 5-methyl-2-pyrrolidinone, ethyl pyrrolidinone, propyl pyrrolidinone, 3-pyrrolidinol; ketones and ketoalcohols, such as acetone, diacetone alcohol, etc.; ethers, such as tetrahydrofuran, dioxane, glycol ether, etc.; oxyethylene or oxypropylene addition dimers, trimers, or polymers, such as diethylene glycol, triethylene glycol, tetraethylene glycol, dipropylene glycol, tripropylene glycol, polyethylene glycol, polypropylene glycol, etc.; alkylene glycols having an alkylene group of 2 to 6 carbons, such as ethylene glycol, propylene glycol, trimethylene glycol, butylene glycol, 1,2,6-hexanetriol, hexylene glycol, etc.; thiodiglycol; glycerin; lower alkyl ethers of a polyhydric alcohol, such as ethylene glycol monomethyl (or monoethyl) ether, diethylene glycol monomethyl (or monoethyl) ether, triethylene glycol monomethyl (or monoethyl) ether, propylene glycol monomethyl (or monoethyl) ether, dipropylene glycol monomethyl (or monoethyl) ether, tripropylene glycol monomethyl (or monoethyl) ether, etc.; lower dialkyl ethers of a polyhydric alcohol, such as triethylene glycol dimethyl (or diethyl) ether, tetraethylene glycol dimethyl (or diethyl) ether, etc.; sulfolane; 1,3-dimethyl-2-imidazolidinone; and any of these in any combination.

Additional examples of the water miscible organic solvent of the ink of the present invention include cyclic esters (also referred to as lactones) that are water-miscible and fall within formula I below:

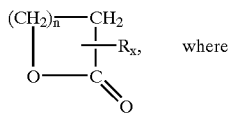

where n is an integer from 1 to 12, R represents one or more substituents that may replace hydrogen in any of the hydrocarbon portions of the molecule, with R being an alkyl group (typically containing from 1 to about 12 carbon atoms), a halogen atom, a sulfate group, a nitro group, a sulfone group, an amide group, or an acetyl group and x being an integer of from 0 to 2n+2. One example of a suitable water-miscible lactone that falls within formula I and that is suitable for use as part or all of the water-miscible organic solvent is butyrolactone,

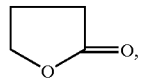

which is also commonly referred to as BLO, γ-butyrolactone, butyryl lactone, 4-butanolide, 1,4-butanolide, and 1,2-butanolide. The water-miscible lactone (s) may be used in any combination with each other and may also be used in any combination with any of the compounds described in the previous paragraph to form the water-miscible organic solvent.

Though ethylene glycol and diethylene glycol may permissibly be included in the ink of the present invention, it is preferred that ethylene glycol and diethylene glycol be minimized in or eliminated from the ink of the present invention because isopropanol and other examples of the water miscible organic solvent tend to better optimize the beneficial properties of the inventive ink. Isopropanol is one preferred example of the water miscible organic solvent since isopropanol encourages formation of bubbles and thereby acts as a degassing agent for enhancing removal of contaminant gases, such as entrained air, from the thermal ink jet printing ink. Also, isopropanol inhibits foaming and helps to maintain the surface tension of the ink in the appropriate range. Furthermore, isopropanol is useful when the ink is applied to coated ink jet recording media because the isopropanol helps to solubilize the recording media coating and consequently helps to enhance bonding of the ink to the coated recording media. Additionally, isopropanol enhances spreading of the water component of the ink on any hydrophobic surfaces of the recording media for uniform dot formation.

The concentration of the water miscible organic solvent in the ink of the present invention may generally range from about 2% to about 50%, by weight, based on the total weight of the ink. The concentration of the water miscible organic solvent in the ink more preferably ranges from about 20% to about 50% by weight, based on the total weight of the ink. The concentration of the water miscible organic solvent in the ink most preferably ranges from about 25% to about 45%, by weight, based on the total weight of the ink.

Any of the water miscible organic solvents listed above may be used individually or may be used in combination as the water miscible organic solvent component of the ink. When used in combination, the various examples of the water miscible organic solvent that are listed above may be used together in any combination. However, the water miscible organic solvent of the ink preferably includes a high-boiling, water miscible organic solvent that is selected from polyethylene glycol, glycerin, glycol ether, cyclic amine, and any of these in any combination. Some examples of cyclic amines that are suitable as the high-boiling, water-miscible organic solvent include alcohols of piperidine, such as 4-piperidine ethanol and N-methyl-4-piperidinol; pyrrolidinones, such as 2-pyrrolidinone, 1-methyl-2-pyrrolidinone (sometimes referred to as NMP), 5-methyl-2-pyrrolidinone, ethyl pyrrolidinone, propyl pyrrolidinone; alcohols of pyrrolidone, such as 3-pyrrolidinol; and any of these in any combination.

A "high-boiling," water miscible organic solvent is a water miscible organic solvent with a boiling point, at 1 atmosphere of gauge pressure, that is greater than the boiling point of water (>212° F.). The water and the high-boiling water miscible organic solvent forms a eutectic mixture. The high-boiling water miscible solvent is believed to control the rate of evaporation of water from the ink. By controlling the water evaporation rate, the high-boiling water miscible solvent is consequently thought to help maintain uniform dispersion of the pigment in the ink, even during and after formation of ink droplets.

The water that is used in combination with the water miscible organic solvent and the pigment dispersion may be present in the ink of the present invention at a concentration ranging from about 5% to about 95% by weight, based on the total weight of the ink. More preferably, the water is present in the ink of the present invention at a concentration ranging from about 35% to about 85% by weight, based on the total weight of the ink. Most preferably, the concentration of the water in the ink ranges from about 40% to about 70% by weight, based on the total weight of the ink.

The pigment dispersion that is combined with the water miscible organic solvent and the water to form the ink of the present invention, depending upon the particular pigment selected for the ink, may generally be present in the ink from about 0.1% to about 30% by weight, based on the total weight of the ink. For example, yellow ink may be made to contain from about 0.3 to about 10 weight percent of the yellow pigment dispersion when the yellow pigment dispersion is the YWD-1155 yellow pigment dispersion, magenta ink may be made to include from about 0.1 to about 20 weight percent of the magenta pigment dispersion when the magenta pigment dispersion is the QWD-0108 magenta pigment dispersion, cyan ink may be made to include from about 0.1 to about 15 weight percent of the B2G blue pigment dispersion pigment dispersion, and black ink may be made to include from about 0.1 to about 30 weight percent of the black pigment dispersion when the black pigment dispersion is the CAB-O-JET™ 300 black pigment dispersion.

The components of the ink are selected so that these components do not cause or support precipitation, agglomeration, or flocculation of the pigment. Polyethylene glycol and glycerin are preferred high-boiling water miscible organic solvents for use in the ink because polyethylene glycol and glycerin have been found to serve as humectants that tend to help prevent clogging and plugging of jetting nozzles in ink jet printers. Cyclic amines, such as 1-methyl-2-pyrrolidinone, are preferred examples of the high-boiling water miscible organic solvent since cyclic amines, such as 1-methyl-2-pyrrolidinone, are thought to enhance adhesion of the ink to paper substrates on which the ink is applied. Also, cyclic amines are thought to help maintain uniform dispersions of the pigment in the ink, even after formation of the ink droplets and application of the ink droplets to the recording medium.

Though surfactants may be incorporated into the ink of the present invention, surfactants are preferably excluded from the ink. The role of any surfactant included in the ink is to reduce the surface tension of the liquid components of the ink to help enhance dispersion of the pigment in the ink. For many pigments, such use of surfactant is not believed necessary to maintain dispersion of the pigment in the ink. Nonetheless, it is permissible to include surfactant in the ink at a concentration ranging from about 0.1 weight percent to about 1.0 weight percent, based upon the total weight of the ink. Some commercially available pigment dispersions are believed to contain surfactant. Also, some examples of water-miscible surfactants that may permissibly be included in the ink are (1) surfactants from the SURFYNOL® line of surfactants that are available from Air Products and Chemicals, Inc. of Allentown, Pa. and (2) surfactants from the TERGITOL® line of surfactants and from the TRITON® line of surfactants that are each available from Union Carbide, inc. of Danbury, Conn. Some non-exhaustive examples of suitable SURFYNOL® surfactants include the SURFYNOL® 440, 502, and 504 surfactants. Some non-exhaustive examples of suitable TERGITOL® surfactants include the TERGITOL® 15-5-7 and 15-5-9 surfactants. Some non-exhaustive examples of suitable TRITON® surfactants include the TRITON® CF-10, CF-21, and XL-80N surfactants.

Besides the water miscible organic solvent, water, and pigment dispersion, the ink of the present invention may additionally include a biocide to enhance the long term stability of the ink versus any detrimental biological organisms that maybe present. Additionally, if it is desired to provide a printed ink that is curable via an energy source, such as ultraviolet radiation, a photoinitiator may be included along with the water miscible solvent, water, and pigment dispersion.

The ink of the present invention that is described above is particularly suited for use in a thermal ink jet printer, such as a bubble jet printer. However, if it is desired, the ink of the present invention may be modified to permit use of the inventive ink in other types of ink jet printers, such as a piezo ink jet printer. This modification for piezo ink jet printing entails the addition of a quick drying water soluble polymer, such as an acrylic polymer. However, for use in thermal ink jet printing, water-soluble polymer, such as the acrylic polymer, is preferably not included in the ink of the present invention, since such water-soluble polymer will detract from the otherwise beneficial properties of the inventive ink in relation to thermal ink jet printing.

Beneficially, the inks of the present invention are capable of being used in high-speed thermal ink jet printing to produce, after drying of the printed ink, circular-shaped dots that are substantially free, and preferably are entirely free, of ragged edges. When the inks of the present invention are used together in an ink set of a thermal ink jet printer, with the different inks of the ink set containing different pigments and/or different concentrations of pigment, each of the ink sets are capable of being used in high-speed thermal ink jet printing to produce circular-shaped dots that have about the same diameter as dots produced with other inks of the particular ink set.

To support high-speed jetting of the ink out of the thermal ink jet printer ink chamber, the ink produced in accordance with the present invention preferably should have a low Brookfield viscosity ranging from about 1.0 centipoise to about 4.0 centipoise at an ink temperature of about 25° C. More preferably, the ink should have a Brookfield viscosity ranging from about 1.0 centipoise to about 3.0 centipoise at an ink temperature of about 25° C. Still more preferably, the ink of the present invention should preferably have a Brookfield viscosity ranging from about 1.5 centipoise to about 2.0 centipoise at an ink temperature of about 25° C. Also, each ink produced in accordance with the present invention should have a surface tension of about 30 to about 74 dynes per centimeter at an ink temperature of about 25° C., with the surface tension more preferably ranging from about 35 to about 45 dynes per centimeter for colored inks and from about 55 to about 65 dynes per centimeter for black inks to enhance the compatibility, and enhance the uniform laydown, of the inventive ink on any coating that is present on the recording media.

When the ink of the present invention is prepared as a plurality of different inks for use as an ink set of an ink jet printer, the low viscosity of the individual inks of the ink sets aids in producing dots of about the same diameter for each ink of the ink set. Ordinarily, different interactions of the individual dots with the recording medium by virtue of the surface tension of the different inks, absent some type of off-setting influence, would cause individual dots formed from different inks to vary in height and to have somewhat different diameters. However, formulation of the inks to have a low viscosity offsets affects of the surface tension of the individual inks and permits individual dots of the different inks to flatten out on the recording medium in the desired circular shape. Additionally, the actual surface tension and viscosity are carefully balanced in each of the different inks of the ink set to give the printed dots of each of the different inks of the ink set about the same diameter, such as about 4 mils to about 5 mils, when printing via thermal ink jet printing on the recording medium.

Inks that are produced in accordance with the present invention have been found to be highly transparent. The small particle size of the pigment that is used in the ink of the present invention, as specified above, helps to enhance the transparency of the inventive inks. Additionally, since transparency is also a measure of impurities, such as salts, within the ink, selection of the ink components based on a high transparency value helps minimize impurity levels in the ink. Minimization of impurities in the ink helps to optimize printer head performance by minimizing precipitation and plating of impurities on the printer head of the ink jet printer. Minimization of precipitable impurities also extends the life of the printer heads. The liquid conductivity of individual inks produced in accordance with present invention should preferably be about 10 milli-mhos, or less, to ensure that impurity levels are held at acceptably low levels. More preferably, the ink of the present invention should have a liquid conductivity of about 5 milli-mhos, or less, to further minimize impurity levels in the ink.

Additionally, the ink produced in accordance with the present invention must be compatible with thermal ink jet printer components. Besides having a low level of impurities to enhance printer head operation and extend printer head life, the ink produced in accordance with the present invention preferably has a pH in the range of about 7 to about 10 to minimize the potential for corrosion of metallic materials that are sometimes used in printer head construction and that are subject to corrosion in acidic environments. An additional consideration is that the pigment and other components used in the ink of the present invention should be thermally stable, and thus not subject to thermal decomposition, at temperatures ranging up to about 300° C., which is the maximum temperature typically experienced by inks in printer heads of thermal ink jet printers.

Inks that are prepared in accordance with the present invention are capable of drying very quickly, typically within less than about one minute, without any post treatment of the printed ink, such as application of hot air to the ink, and consequently permit high speed ink jet printing of multiple dot layers on the recording medium. If desired, hot air may be applied to the ink to further accelerate drying of the ink. However, such application of hot air is not essential to attaining quick ink drying rates.

The inks of the present invention are considered to be dry when the printed ink is free of tackiness and does not smear with application of finger pressure. Again, even without application of any post-treatment, such as application of hot air, the inks of the present invention typically meet this standard of dryness within less than about one minute after being printed on the recording medium.

One net effect of the process of preparing individual inks, including individual inks of an ink set, in accordance with the present invention is that each ink may have very similar performance characteristics within a relatively narrow range so that the jetability, the speed of ink jet printing, and the printed dot sizes and shapes of the different inks are essentially the same for each different ink. This is true, even though different pigments are used in making different inks and even though inks of the same color may have different pigment concentrations, since the pigment of each different ink produced in accordance with the present invention makes up only a small percentage of each of the different inks. Forcing the individual inks to have similar performance properties in this manner simplifies the process of inkjet printing, especially when using inks sets that contain multiple inks of the present invention, because this use of inks with similar performance characteristics between different inks negates any need to compensate for differences, other than color, between different inks.

The process of making the inks of the present invention is simple and straightforward and, unlike many of the pigmented inks of the prior art, does not require any complex, expensive processing equipment or procedures. First, all of the components of the ink, such as the water, water miscible organic solvent(s), pigment dispersion, and any optional ingredients (biocide, for example) are combined together in a mixing container. Thereafter, the combined components are blended together using any commercially available, low shear, mixing apparatus that does not promote foaming and does not cause the pigment of the ink to be modified in size or agglomerated. One suitable low shear mixing technique merely entails slowly stirring the various ink components together to effect blending.

Next, air bubbles that may have been introduced during the mixing of the components are removed from the ink by vacuuming the ink in accordance with standard and well known procedures for vacuuming inks. The vacuuming of the ink may be accompanied by use of any conventional ultrasonic vibration source in the ink to speed up the removal of trapped air bubbles. Next, after removal of any trapped air bubbles, the ink is preferably further treated by ultrasonic mixing, such as by placing the ink mixing vessel in an ultrasonic bath. The ultrasonic bath helps to enhance uniform dispersal of the pigment in the ink and helps to finalize removal of any remaining entrained air bubbles. Examples 1–12 that are exhibited in Table I below demonstrate some preferred compositions of the ink produced in accordance with the present invention:

TABLE I

|  | Distilled Water (Wt. %) | Polyethylene Glycol (Wt. %) | Glycerin (Wt. %) | 1-Methyl-2 Pyrrolidinone (Wt. %) | Isopropyl Alcohol (Wt. %) | Pigment Dispersion (Wt. %) |
|---|---|---|---|---|---|---|
| Dark Yellow Ink (Example 1) | 67 | 10 | 10 | 5 | 5 | 3 |
| Dark Magenta Ink (Example 2) | 54.5 | 10 | 10 | 5 | 2.5 | 18 |
| Dark Cyan Ink (Example 3) | 53 | 15 | 12.5 | 5 | 2.5 | 12 |
| Dark Black Ink (Example 4) | 37.5 | 10 | 10 | 10 | 2.5 | 30 |
| Medium Yellow Ink (Example 5) | 69.1 | 10 | 10 | 5 | 5 | 0.9 |
| Medium Magenta Ink (Example 6) | 67.1 | 10 | 10 | 5 | 2.5 | 5.4 |
| Medium Cyan Ink (Example 7) | 61.4 | 15 | 12.5 | 5 | 2.5 | 3.6 |

TABLE I-continued

|  | Distilled Water (Wt. %) | Polyethylene Glycol (Wt. %) | Glycerin (Wt. %) | 1-Methyl-2 Pyrrolidinone (Wt. %) | Isopropyl Alcohol (Wt. %) | Pigment Dispersion (Wt. %) |
|---|---|---|---|---|---|---|
| Medium Black Ink (Example 8) | 58.5 | 10 | 10 | 10 | 2.5 | 9 |
| Light Yellow Ink (Example 9) | 67.3 | 10 | 10 | 5 | 5 | 0.3 |
| Light Magenta Ink (Example 10) | 70.7 | 10 | 10 | 5 | 2.5 | 1.8 |
| Light Cyan Ink (Example 11) | 63.8 | 15 | 12.5 | 5 | 2.5 | 1.2 |
| Light Black Ink (Example 12) | 64.5 | 10 | 10 | 10 | 2.5 | 3 |

All weight percentages provided in Table I are based on the total weight of the ink of the particular example.

In Examples 1, 5 and 9, the pigment dispersion used was YWD-1155 yellow pigment dispersion that is available from Sun Chemical Corporation. In Examples 2, 6, and 10 of Table I, the pigment dispersion used was QWD-0108 magenta pigment dispersion that is also available from Sun Chemical Corporation. In Examples 3, 7 and 11 of Table I, the pigment dispersion used was B2G blue pigment dispersion that is available from Clarion Corporation. The pigment dispersion used in Examples 4, 8 and 12 of Table I was CAB-O-JET® 300 black pigment dispersion that is available from Cabot Corporation. In each of Examples 1-12, the polyethylene glycol was purchased as CARBOWAX® 200 polyethylene glycol, that is available from Union Carbide Corporation.

Examples 13–16 that are exhibited in Table II below demonstrate some additional preferred compositions of the ink produced in accordance with the present invention:

TABLE II

|  | Distilled Water (Wt. %) | γ-butyro-lactone (Wt. %) | Dipropylene Glycol (Wt. %) | Dipropylene Glycol Methyl Ether (Wt. %) | Pigment Dispersion (Wt. %) |
|---|---|---|---|---|---|
| Yellow Ink (Example 13) | 45 | 35 | 5 | 5 | 10 |
| Magenta Ink (Example 14) | 40 | 35 | 5 | 5 | 15 |
| Cyan Ink (Example 15) | 45 | 35 | 5 | 5 | 10 |
| Black Ink (Example 16) | 40 | 30 | 0 | 0 | 30 |

All weight percentages provided in Table II are based on the total weight of the ink of the particular example.

In Example 13, the pigment dispersion used was YJD-3174 yellow pigment dispersion that is available from Sun Chemical Corporation. In Example 14, the pigment dispersion used was QJD-3122 magenta pigment dispersion that is also available from Sun Chemical Corporation. In Example 15, the pigment dispersion used was BJD-3115 blue pigment dispersion that is also available from Sun Chemical Corporation. The pigment dispersion used in Example 16 was 907-23A (experimental) black pigment dispersion that was obtained from Sun Chemical Corporation.

The inks of the present invention may have numerous other formulations, in accordance with details previously provided herein, in addition to those provided in Examples 1–16. For example, yellow ink may be made to contain from about 0.3 to about 10 weight percent of the yellow pigment dispersion, magenta ink may be made to include from about 0.1 to about 20 weight percent of the magenta pigment dispersion, cyan ink may be made to include from about 0.1 to about 15 weight percent of the pigment dispersion, and black ink may be made to include from about 0.1 to about 30 weight percent of the black pigment dispersion. Continuing with these additional examples, as the amount of pigment dispersion is changed, the amount of distilled water may be changed by the same weight percentage in the opposite direction to that of the pigment dispersion concentration change, while letting the concentrations (weight percentages) of the particular water-miscible organic solvent (s) (such as polyethylene glycol, glycerin, 1-methyl-2-pyrrolidinone, and isopropyl alcohol in Examples 1-12 and γ-butyrolactone, dipropylene glycol, and dipropylene glycol methyl ether in Examples 13–16) remain the same, or approximately the same.

Beneficially, the inks of the present invention, such as the inks of Examples 1–16 above, yield a surprising and unexpected result, even before being placed in a thermal ink jet printer. Specifically, the pigmented inks that are produced in accordance with the present invention, such as the pigmented inks of Examples 1–16, have been found to exhibit extraordinary long term stability and, consequently, a very long shelf life. For example, the pigment that is included in the pigmented inks of the present invention, such as the pigmented inks of Examples 1–16, has surprisingly been found to remain uniformly dispersed in the ink for very long periods of time, such as about a month, about six months, about one year, and even about two years or longer, without any precipitation, agglomeration, or flocculation of the pigment in the ink.

The lack of precipitation, agglomeration, or flocculation are demonstrated by both visual observations and by the performance of the inventive ink during printing tests. For example, the lack of precipitation is reflected by the visual observation that no, or essentially no, pigment particles remain in the ink storage container after the ink is poured entirely out of the ink storage container. The lack of flocculation is reflected by the observation that no clumps of pigment particles are visually observed to be floating at or near the top of the ink in the ink storage container. Finally, the lack of agglomeration is reflected by the observation that no lumps or agglomerates of pigment are visually observed when pouring the ink slowly out of the ink storage container. As another example, the lack of precipitation, agglomeration, or flocculation is also reflected by the ability to store the ink of the present invention in a cartridge of a thermal ink jet printer for at least about two years, or longer, and the ability to thereafter print the ink using the thermal ink jet printer, without shaking or agitating the cartridge, without plugging the nozzles of the ink jet printer.

Thus, even after being allowed to sit for about two years, or more, the inks of the present invention are still stable and ready for immediate use in a printer. This means that one who purchases the ink of the present invention can store the purchased ink for a relatively long period, such as at least about two years or more, then may take the ink off the shelf and immediately place the ink in the printer without having to shake or mix the ink and without worrying about whether or not the ink will print and produce excellent results. This phenomena is not replicated by any prior pigmented ink jet ink, not even expensive pigmented thermal inkjet inks that are based upon sophisticated proprietary pigments and/or sophisticated dispersion agents.

The stability of the inventive ink contributes to the media-independence of the ink. More specifically, it has been surprisingly discovered that a particular ink of the present invention that is identically applied to two different substrates appears visually to have the identical color, despite differences between the substrates. Ordinarily, due the high transparency of the inventive inks, one would expect differing feed-through effects from the differing substrates to be visible through the applied ink droplets. However, apparently due to the highly stable nature of the inventive ink, the stable and uniform dispersion of the very small (sub-micron) pigment particles in the ink prevents such differing "feed-through" effects from differing substrates, despite the highly transparent nature of the inks. Consequently, as stated above, a particular ink of the present invention that is identically applied to two different substrates appears visually to have the identical color, despite differences between the substrates. In a related vein, it has been surprisingly found that a particular ink of the present invention that is identically applied to two identical copies of the same substrate appears visually to have the identical color, despite being applied to the substrates at different times, such as days or even weeks apart. The statement of the previous sentence has been found to remain true even when different batches of the particular ink that have the same formulation are employed.

For purposes of determining whether two separately applied inks, visually appear to have the same color, the L*, a*, and b* values of both applied inks are determined in accordance with reflectance spectra determination procedure provided below in the Property Characterization of this document. After determining L*, a*, b*, for the two applied inks, $\Delta E^*_{ab}$ is calculated using the following equation: $\Delta E^*_{ab} = [(\Delta L^*)^2 + (\Delta a^*)^2 + (\Delta b^*)^2]^{0.5}$, as explained more fully in the Property Characterization of this document. For purposes of this document, two separately applied inks are considered to visually appear to have the same color when the $\Delta E^*_{ab}$ value that is calculated based upon the L*, a*, and b* values of both applied inks is about 5 or less.

The printing industry will readily recognize the important ramifications of this discovery about repeatedly being able to attain the same color from the same ink, either when printing on different substrates or when printing the same ink at widely varying times or from different batches of the same ink. For example, in short run printing of cloth, fabric, or textile, a printer could print a particular pattern on a first small batch of from 10 to 100 dresses, could thereafter use the thermal ink jet printing equipment for a different project involving different inks and a different pattern, and could thereafter print the particular pattern on a second small batch of from 10 to 100 dresses, while remaining confident that the particular pattern that is printed on the dresses of the first small batch and on the dresses off the second small batch will visually appear to be identical in color. This repeatability that is supplied by the inks of the present invention will yield substantial flexibilities in how printers schedule their projects and manage their inventory.

The contribution of the ink stability to this media-independence of the inventive ink is thought to be due, at least in substantial part, to maintenance of uniform pigment dispersion in the ink from start to finish—that is, from initial production, through any storage, through jetting via thermal ink jet printer, and through application and bonding to the recording media. The uniform pigment dispersion in the inventive ink is attributable to the formulation and pigment selection for the inventive ink.

The stability, long shelf life phenomena, and uniform pigment dispersion of the inventive ink is all the more surprising considering that the ink of the present invention is based on relatively inexpensive components that are combined using simple equipment via a very simple mixing procedure. Indeed, the cost of making the pigmented inks of the present invention, including the cost of the ingredients and the processing cost (about $5 per pound of the inventive ink, or less), is approximately the same as, or even lower than, the retail purchase price of pigmented inks currently used in graphic arts industry printing systems, such as lithographic printing systems, screen printing systems, gravure printing systems, flexographic printing systems, and offset printing systems. On the other hand, the retail purchase prices for pigmented thermal ink jet inks of the prior art are often as high as about $300 per pound, or more, depending upon the sophistication of the pigment and pigment dispersant.

Thus, the pigmented inks of the present invention are many times less costly than pigmented thermal ink jet inks of the prior art. Consequently, due to this extreme cost advantage alone, while not even taking into account the substantial shelf life and printing performance advantages of the inventive ink, the pigmented ink of the present invention will help to expand the market for thermal ink jet printing, such as to the graphic arts industry, as an attractive replacement for traditional printing systems, such as lithographic printing systems, screen printing systems, gravure printing systems, flexographic printing systems, and offset printing systems.

The inks of the present invention are preferably used in a thermal ink jet printer that is supplied by ColorSpan Corporation, Inc. of Eden Prairie, Minn. One of the preferred ink jet printers that is available from ColorSpan Corporation, Inc. is the DISPLAYMAKER® Series XII large format ink jet printer. Those skilled in the art will readily understand that the ink and the ink sets produced in accordance with the present invention may be incorporated into other types of ink jet printers, besides the particular thermal ink jet printer mentioned above, such as other models of thermal ink jet printers, piezo ink jet printers, and plunger-types of ink jet printers.

The inks of the present invention may also be used in connection with the COLORMARK® on-head camera system that is available from ColorSpan Corporation, Inc. of Eden Prairie, Minn. The COLORMARK® on-head camera system is described in detail in the following patent application filed by the indicated inventors in the United States Patent and Trademark Office on Mar. 2, 1999:

application Ser. No.: 09/260,925

Title: Method for Automatically Forming Ink and Media-Dependent Color Transforms For Diverse Colored Inks and Ink Types, Validating Color gamut, and Applying Said Inks Inventors: C. M. Wickham et. al.

All details in this application Ser. No. 09/260,925 are hereby incorporated by reference. The COLORMARK® on-head camera system is used to create a table of L*, a*, and b* values that are obtained from a plurality of printed inks having different colors, map the L*, a*, and b* values of each pixel in a original image, and then, using the table of L*, a*, and b* values, transform the L*, a*, and b* values obtained from the original image into a set of inks that may be applied by process printing in a thermal ink jet printer to exactly replicate the original image. The inks of the present invention are particularly suited to use in the COLORMARK® on-head camera system due to the long term stability of the inventive inks and the ability of each discrete formulation of the inventive ink having a particular color to repeatedly reproduce the same color in a printed dot, no matter what substrate the particular formulation of the ink is printed on.

Besides incorporating the inventive ink into a variety of different types of ink jet printers, the ink of the present invention, some non-exhaustive examples of which are any of the inks of Examples 1–16, may be printed as high quality, uniform, circular-shaped dots on a wide variety of different recording mediums, some non-exhaustive examples of which are coated or uncoated cloth; coated or uncoated textiles; coated or uncoated fabrics; any leather; any coated or uncoated substrate marketed as an ink jet recording medium; coated and uncoated cardboard; coated and uncoated canvas; plain paper of the type typically used in office copy machines; coated papers, such as high gloss photobase paper; and coated or uncoated synthetic papers and webs incorporating or consisting of polymeric material, such as polyolefin (i.e. polyethylene, polypropylene, and polystyrene), polyester (such as polyethylene terephthalate and polybutylene terephthalate), spandex, acrylonitrile, polyamide, vinyl acetate, vinyl chloride, cellulose, any copolymer of any of these, and any mixture of any of these.

Of course, to enhance the dimensional stability of the recording medium while being passed through the printing equipment, the recording medium may permissibly include any conventional temporary or permanent backing material on any side of the recording medium that is not being printed with the inventive ink, to prevent dimensional instability, such as stretching, of the recording medium during the printing process. Any such temporary backing material may be removed according to conventional practice at an appropriate time following printing of the inventive ink onto the recording medium.

The textile and the fabric that may serve as the recording medium for the pigmented ink of the present invention may be based on woven or knitted yarn, thread, or fiber that is (1) synthetic, (2) derived from animals, (3) derived from plants, or any combination of any of these. Some non-exhaustive examples of synthetic yarns or fibers include yarns or fibers made of or incorporating polymeric material, such as polyolefin (i.e. polyethylene, polypropylene, and polystyrene), polyester (such as polyethylene terephthalate and polybutylene terephthalate), spandex, acrylonitrile, polyamide, vinyl acetate, vinyl chloride, rayon, any copolymer of any of these, and any mixture of any of these. Some non-exhaustive examples of animal-derived yarns or fibers include yarns or fibers made of or incorporating silk, wool, cashmere, qiviut, mohair, animal hair, and any of these in any combination. Some exemplary sources of suitable animal hair include alpaca, angora, beaver, camel, for, raccoon, and weasel. Some non-exhaustive examples of plant-derived yarns, threads, or fibers include yarns, thread, or fibers made of or incorporating abaca, linen, cotton, flax, ramie, hemp, jute, sisal, kenaf, sunn, urena, alginate, cellulose, and any of these in any combination.

The non-exhaustive list of recording mediums that is provided above for use with the ink of the present invention is described in terms of both coated and uncoated recording mediums, such as coated or uncoated cloth, coated or uncoated textiles, coated or uncoated fabrics, etc. Unless otherwise indicated, all references to "coated," in connection with the exemplary recording media, refers to recording media that has been coated, prior to printing of the inventive ink, with (1) a substance that is designed to enhance one or more functional attributes of the recording media, such as, for example, abrasion resistance, durability, dimensional stability, colorfastness, etc. and/or (2) a substance that is designed to support absorption of the inventive ink into and/or adhesion of the inventive ink to the recording media. On the other hand, all references to "uncoated," in connection with the exemplary recording media, refers to recording media that has not been coated, prior to printing of the inventive ink, with any type of substance, such as a substance that is designed to enhance one or more functional attributes to the recording media or a substance that is designed to support absorption of the inventive ink into and/or adhesion of the inventive ink to the recording media.

Though the recording medium to which the inventive ink is applied may permissibly include a coating of a substance that is designed to support absorption of the inventive ink into the recording medium and/or adhesion of the inventive ink to the recording medium, it has been surprisingly discovered that the recording medium to which the inventive ink is applied does not require any such coating in order for the inventive ink to be successfully printed onto, absorbed into, and adhered to the recording medium. Furthermore, besides not requiring any such coating, it has been found that no post-treatment of the printed ink, such as application of hot air to the printed ink, is required to effect drying of the printed ink, since, no matter what recording medium the ink is printed onto, the printed ink dries rapidly, such as within less than about one minute, without any post treatment of the printed ink. Additionally, it has been surprisingly discovered that the recording medium to which the inventive ink is applied may be pre-washed or pre-processed to produce particular desired effects in the recording medium, such as selective fading or wrinkling of the recording medium, without diminishing the ability of the inventive ink to be subsequently and successfully printed onto, absorbed into, and adhered to the recording medium.

In several particular examples, when applied onto uncoated recording media, such as uncoated cotton-based canvas, uncoated fabric formed of polyester-based fiber, uncoated fabric formed of rayon (cellulose-based) yarn, uncoated cloth formed of cotton fibers, and uncoated cloth that is formed of nylon fibers, it was surprisingly discovered that the inks of the present invention form uniform circular-shaped printed dots that strongly adhere to these examples of uncoated recording media, when printed onto these examples of uncoated recording media without any post-treatment of the printed dots. This is a surprising result, since the fabric industry typically relies on dye-containing inks to print on coated, as opposed to uncoated, forms of these recording media. For example, the fabric industry typically (1) relies primarily upon acidic dyes and dispersed dyes for printing on coated fabric formed of polyester-based fiber, (2) relies primarily upon dispersed dyes for printing on coated fabric formed of rayon (cellulose-based) yarn, (3) relies primarily upon reactive dyes and direct dyes for printing on coated cotton-based canvas and coated cloth formed of cotton fibers, and (4) relies primarily upon acid dyes for printing on coated fabric formed of nylon fibers or silk fibers. The ability of the inks of the present invention to form uniform circular-shaped printed dots that strongly adhere to these aforementioned examples of uncoated recording media, when printed onto these examples of uncoated recording media without any post-treatment of the printed dots is additionally a surprising result, since the fabric industry typically incorporates a post-treatment step, such as application of steam or application of steam and air to the printed dye-based ink dots, to fix the printed dye-based inks dots to the aforementioned coated forms of recording media.

Thus, the fabric industry typically (1) employs dyes, many of which are proprietary and expensive, in inks to be applied to fabric, (2) employs coated forms of the fabric that serve as the recording media for the dye-based inks, and (3) incorporates a post-treatment step to fix the printed dye-based inks dots to the coated forms of recording media. The present invention thus offers various economies over fabric printing that employs dye-based inks, since the ink of the present invention, when used for printing on fabrics, (1) employs pigment that is typically many times less expensive than dyes that are presently included in inks to be printed on fabric, (2) does not require any coating on the fabric that serves as the recording media, and (3) does not require any post-treatment of the printed dots of the inventive ink. Beyond these advantages of the inventive ink, there is yet another advantage attributable to the inventive ink. Specifically, when the pigmented ink of the present invention, such as any of the inks of Examples 13–16, is printed on the afore-mentioned exemplary types of uncoated recording media, less than 1 percent bleed of the printed ink is observed when the printed recording media, following drying of the printed ink, is washed in a conventional consumer washing machine using a conventional consumer detergent, such as TIDE® detergent that is available from Procter & Gamble of Cincinnati, Ohio. Thus, besides typically being less expensive to procure, requiring no coating on the fabric recording media, and requiring no post-treatment after ink application, the pigmented ink of the present invention is durable and sturdy, even when applied to uncoated recording media, such as uncoated cotton-based canvas and uncoated fabrics formed of natural or synthetic material including, but not limited to, polyester-based fiber, rayon (cellulose-based) yarn, cotton fibers, and nylon fibers.

In another particular application, it was surprisingly discovered that the inks of the present invention form uniform, circular-shaped printed dots that strongly adhere to silk, when printed onto the silk. This is a surprising result, since pigmented thermal ink jet inks do not typically adhere strongly to silk. It is known that dye-based inks must incorporate acidic dyes to permit strong adherence of the dye-based inks to silk. Though not wishing to be bound by theory, it is thought that the pigment selected for use in the ink of the present invention may include an acidic group on the surface of the pigment that facilitates strong adherence of the pigment-based ink of the present invention to the silk. Indeed, when the pigmented ink of the present invention is printed on silk, less than 1 percent bleed of the printed ink is observed when the printed silk, following drying of the printed ink, is washed in a conventional consumer washing machine using a conventional consumer detergent, such as TIDE® detergent that is available from Procter & Gamble of Cincinnati, Ohio.

A number of surprising and unexpected results have been observed and documented when the inks of the present invention, such as the inks of Examples 1–16 above, are used in thermal ink jet printers, such as the thermal ink jet printer described above that is available from ColorSpan Corporation, Inc. First, it was discovered that these inks do not plug up the ink jet nozzles of the printers, even though the ink remains in the printers and nozzles for relatively long periods of time, such as over a weekend (about 60 hours, for example), without printing of the ink by the thermal ink jet printers. This is a surprising and unexpected result because, in the experience of the inventor of the present ink, existing inks, including even expensive pigmented thermal ink jet inks that are based upon sophisticated proprietary pigments and/or sophisticated dispersion agents, typically coalesce and plug up the ink jet nozzles, when the thermal ink jet printers are not used for a relatively short period of time, such as overnight. Indeed, it is well known in the thermal ink jet printing art that the ink jet nozzles of printer heads holding inks for extended periods of time, such as overnight, must typically be wiped clean after these periods of non-use to remove ink plugs that form in the nozzles before printing may resume.

Also, it has been surprisingly discovered that ink dots produced by thermal ink jet printing inks produced in accordance with the present invention may be overlapped with each other in any order without affecting the color that is visually observed when looking at the printed, layered ink dots. This ability to change the order of overlapping dots without changing the visually observed color applies to ink dots based on any colors of the inventive ink, other than ink based on black pigment. This ability has also been found to exist even when two or more of the ink dots are based on inks having different concentrations of the same pigment.

As an example, this ability has been observed with respect to the cyan inks, the magenta inks, and the yellow ink of Table I, when the black ink of Table I is excluded from the stack of printed dots. No matter how dots of these Table I inks are stacked, the visually observed color of the stacked ink dots remains the same. For instance, when dots of the light cyan ink of Table I are laid down on a sheet of white recording paper (not shown), dots of the dark magenta ink of Table I are laid down on the light cyan ink, and dots of the dark yellow ink of Table I are then laid down on the dots of the cyan ink, using any particular thermal ink jet printer, it has been found that the color visually observed by looking at the image formed by the various dots layered on the white recording paper is virtually the same as the visually observed color of a different image where dots of the same dark yellow ink are first laid down on the white recording paper, dots of the same light cyan ink are then laid down on the dark yellow ink dots, and dots of the dark magenta ink are then laid down on the light cyan ink dots by the same thermal ink jet printer.

This ability to order the different colors of inks differently, while continuing to visually observe virtually the same color when viewing the different image, is believed to be due, at least in part, to both the high transparencies of the inks produced in accordance with the present invention and the thermal stability of the pigments used in forming the inks of the present invention. Stacking different colors of prior art inks in different orders on substrates by thermal ink jet printing causes the visually observed color of the resulting images to change somewhat, apparently because prior art inks are typically somewhat opaque and/or rely upon pigment particles with a larger nominal particle size than those employed in the present invention.

Though ink sets produced in accordance with the present invention may be used to form a variety of different types of images, such as half tone images where dots are stacked on top of individual dots in a pixel matrix, ink sets produced in accordance with the present invention have been found especially useful in forming stochastic images. When producing stochastic images, one or more base ink dots are first printed onto the substrate via ink jet printer. The base ink dots may all be the same color or different colors in any combination. In addition, any color(s) of ink used to form the base ink dots may have two or more different concentrations of the same pigment. Each base ink dot may be positioned in any way relative to the other base ink dots of the image. For example, some of the base ink dots may overlap other base ink dots. As another example, any of the base ink dots may be spaced apart from other base ink dots within the printed image by any distance.

After the base ink dots are positioned on the substrate, one or more secondary ink dots may be printed onto the layer of the base ink dots in any pattern. The secondary ink dots may all be the same color or different colors in any combination. In addition, any color(s) of ink used to form secondary ink dots may have two or more different concentrations of the same pigment. Each secondary ink dot may be positioned in any way relative to the base ink dots and other secondary ink dots of the image to obtain desired color combinations in the image. For example, any secondary ink dot may overlap other secondary ink dots and/or any of the base ink dots. As another example, any of the secondary ink dots may be spaced apart from other secondary ink dots within the image by any distance.

Also, one or more different layers (such as a third layer, a fourth layer, etc.) of additional ink dots may be applied onto the secondary ink dots to further modify the printed image. Individual dots of the additional layer(s) may overlap with one or more of the secondary ink dots and/or any other dots, such as any of the base ink dots, that are present in the image to obtain desired color combinations in the printed image. All comments with respect to the secondary ink dots apply equally with respect to any additional ink dots applied to the image. An important aspect of the image produced in this fashion is that the image fully covers the recording medium or substrate so that the recording medium or substrate is not directly visible through the image. This is different from half tone images printed with ink jet printers where the substrate is visible following image application to the recording medium or substrate.

Ink sets may be produced by pre-selecting inks of the present invention that, when printed in a predetermined fashion by computer control, match each of the individual ink colors of commercially available color standards, such as the PANTONE MATCHING SYSTEM® color matching system that is available from Pantone, Inc. of Carlstadt, N.J. The PANTONE MATCHING SYSTEM® color matching system is based upon a total of fourteen different standard colors of pigmented inks. These fourteen different standard colors of ink are currently known as (1) PANTONE® yellow ink, (2) PANTONE® yellow 012 ink, (3) PANTONE® orange 021 ink, (4) PANTONE® warm red ink, (5) PANTONE® red 32 ink, (6) PANTONE® rubine red ink, (7) PANTONE® rhodamine red ink, (8) PANTONE® purple ink, (9) PANTONE® violet ink, (10) PANTONE® blue 072 ink, (11) PANTONE® reflex blue ink, (12) PANTONE® process blue ink, (13) PANTONE® green ink, and (14) PANTONE® black ink.

Ink sets may be produced in accordance with the present invention that will collectively permit reproduction of any color image, no matter how the image was originally created. This ability derives from the wide color gamut that ink sets produced in accordance with the present invention are capable of attaining when used in ink jet printing. Ink sets selected in accordance with the present invention may include any combination of any number of different inks of the present invention, limited only by the number of inks the ink jet printer of choice is able to accommodate. The different inks may include any combination of different colored inks and any number of inks with different concentrations of the same pigment.

For example, an ink set could be selected in accordance with the present invention to have an ink (1) with one pigment (a) at a single concentration of the pigment (a), an ink (2) with one pigment (b) at a single concentration of the pigment (b), inks (3–5) in three different concentrations of pigment (c), and inks (6–8) in three different concentrations of pigment (d). As another example, a different ink set selected in accordance with the present invention may include inks (1–8) at a single concentration of pigments (a–h), respectively, only. As yet another example, an ink set selected in accordance with the present invention may include inks (1–2) in two different concentrations of pigment (a), inks (3–4) in two different concentrations of pigment (b), and inks (5–10) in six different concentrations of pigment (c). As still another example, an ink set selected in accordance with the present invention may include inks (1–2) in two different concentrations of pigment (b), and inks (3–4) in two different concentrations of pigment (b), and inks (5–6) in two different concentrations of pigment (c).

Any ink set that incorporates inks of the present invention may be based on a set of prepared inks in different colors, such as the primary cyan, magenta, and yellow colors and black. Also, any ink set that incorporates inks of the present invention may include inks that are prepared by mixing different proportions of pre-prepared primary color inks, such as in accordance with color combination formulas or guides of a color matching system (the PANTONE MATCHING SYSTEM® color matching system, for example) to achieve any color exhibited in the color matching system. Such mixing of pre-prepared primary color inks that are prepared in accordance with the present invention is simple and trouble-free due to the high pigment dispersion stability of the inventive inks and due to the ability to simply combine and mix different inks of the present invention in any combination without employing any complex or expensive mixing equipment or procedures and without having to worry about any sedimentation, agglomeration, or flocculation of the pigments in the completed mixture of different inks.

This mixing of pre-prepared primary color inks results in formation of inks that may be included in an ink set and applied as spot colors to achieve colors in a printed image unattainable by process printing of process color inks also present in the ink set. Thus, the ink of the present invention provides an avenue for hybridizing the spot color and process color printing techniques. This provides printers with a technique of achieving unique color gamuts, using an ink set with a particular number of inks, that would not be achievable when relying on only process printing of the inks in the ink set.

Different combinations (sets) of inks of the present invention may be created for purposes of attaining different goals. For example, one particular combination of interest, that is nicknamed the "Color System" combination, includes twelve inks as three sets of four different colors. In the Color System combination, the first set includes a dark cyan ink with the formulation used in Example 3, a dark magenta ink with the formulation used in Example 2, a dark yellow ink with the formulation used in Example 1, and a dark black ink with the formulation used in Example 4. The second and third sets of the Color System combination are identical to the first set of the Color System combination. Thus, the Color System combination includes three replicates of the same dark cyan ink, three replicates of the same dark magenta ink, three replicates of the same dark yellow ink, and three replicates of the same two dark black inks, for a total of twelve inks representing four different colors.

The Color System combination of inks exhibits outstanding performance when printed using the DISPLAYMAKER® Series XII large format ink jet printer that is available from ColorSpan Corporation, Inc. of Eden Prairie, Minn. One benefit of the Color System combination is provision of a large volume of high quality pigmented inks capable of supporting longer four color process printing runs. Another benefit of the Color System combination, that is believed to derive from the highly transparent inks incorporated in the Color System combination, is the wide color gamut attainable by the Color System combination. Yet another benefit of the Color System combination is the repeatability in visual observed color of printed images of the Color System inks, no matter whether the Color System inks are printed on different substrates, are printed at widely varying times, and/or originate as different batches of the same ink, for a particular color ink of the Color System Combination.

Another particular combination (or set) of interest, that is nicknamed the "Gamut+ Mode Hi-Fi" combination, includes twelve inks as two sets of four different colors and two additional sets of two more colors. In the Gamut+ Mode Hi-Fi combination, a first set includes a dark cyan ink with the formulation used in Example 3, a dark magenta ink with the formulation used in Example 2, a dark yellow ink with the formulation used in Example 1, and a dark black ink with the formulation used in Example 4. A second set of the Gamut+ Mode Hi-Fi combination is identical to the first set of the Gamut+ Mode Hi-Fi combination. A third set of the Gamut+ Mode Hi-Fi combination includes an orange ink that is based upon on an orange pigment and a green ink that is based upon a green pigment. The orange ink and the green ink are prepared in accordance with the present invention to match any desired orange or green color standard or sample. A fourth set of the Gamut+ Mode Hi-Fi combination is identical to the third set of the Gamut+ Mode Hi-Fi combination. Thus, the Gamut+ Mode Hi-Fi combination includes two replicates of the same dark cyan ink, two replicates of the same dark magenta ink, two replicates of the same dark yellow ink, two replicates of the same dark black ink, two replicates of the same orange ink, and two replicates of the same green ink for a total of twelve inks representing six different colors.

The Gamut+ Mode Hi-Fi combination of inks exhibits outstanding performance when printed using the DISPLAYMAKER® Series XII large format inkjet printer that is available from ColorSpan Corporation, Inc. One benefit of the Gamut+ Mode Hi-Fi combination is provision of a large volume of high quality pigmented inks capable of supporting longer six color process printing runs. Another benefit of the Gamut+ Mode Hi-Fi combination, that is believed to derive from the highly transparent inks incorporated in the Gamut+ Mode Hi-Fi combination, is the wide color gamut attainable by the Gamut+ Mode Hi-Fi combination. Yet another benefit of the Gamut+ Mode Hi-Fi combination is the repeatability in visual observed color of printed images of the Gamut+ Mode Hi-Fi inks, no matter whether the Gamut+ Mode Hi-Fi inks are printed on different substrates, are printed at widely varying times, and/or originate as different batches of the same ink, for a particular color ink of the Gamut+ Mode Hi-Fi combination.

Another particular combination (or set) of interest, that is nicknamed the "Gamut+ Mode R & B" combination, includes twelve inks as two sets of four different colors and two additional sets of two more colors. In the Gamut+ Mode R & B combination, a first set includes a dark cyan ink with the formulation used in Example 3, a dark magenta ink with the formulation used in Example 2, a dark yellow ink with the formulation used in Example 1, and a dark black ink with the formulation used in Example 4. A second set of the Gamut+ Mode R & B combination is identical to the first set of the Gamut+ Mode R & B combination. A third set of the Gamut+ Mode R & B combination includes a red ink that is based upon a red pigment and a blue ink that is based upon a blue pigment. The red ink and the blue ink are prepared in accordance with the present invention to match any desired red or blue standard or sample. A fourth set of the Gamut+ Mode R & B combination is identical to the third set of the Gamut+ Mode R & B combination. Thus, the Gamut+ Mode R & B combination includes two replicates of the same dark cyan ink, two replicates of the same dark magenta ink, two replicates of the same dark yellow ink, two replicates of the same dark black ink, two replicates of the same red ink, and two replicates of the same blue ink for a total of twelve inks representing six different colors.

The Gamut+ Mode R & B combination of inks exhibits outstanding performance when printed using the DISPLAYMAKER® Series XII large format ink jet printer that is available from ColorSpan Corporation, Inc. One benefit of the Gamut+ Mode R & B combination is provision of a large volume of high quality pigmented inks capable of supporting longer six color process printing runs. Another benefit of the Gamut+ Mode R & B combination, that is believed to derive from the highly transparent inks incorporated in the Gamut+ Mode R & B combination, is the wide color gamut attainable by the Gamut+ Mode R & B combination. Yet another benefit of the Gamut+ Mode R & B combination is the repeatability in visual observed color of printed images of the Gamut+ Mode R & B inks, no matter whether the Gamut+ Mode R & B inks are printed on different substrates, are printed at widely varying times, and/or originate as different batches of the same ink, for a particular color ink of the Gamut+ Mode R & B combination.

Yet another particular combination (or set) of interest, that is nicknamed the "Hi-Res" combination, includes twelve inks as two sets of four different colors and two additional sets of two more colors. In the Hi-Res combination, a first set includes a dark cyan ink with the formulation used in Example 3, a dark magenta ink with the formulation used in Example 2, a dark yellow ink with the formulation used in Example 1, and a dark black ink with the formulation used in Example 4. A second set of the Hi-Res combination is identical to the first set of the Hi-Res combination. A third set of the Hi-Res combination includes a medium cyan ink with the formulation used in Example 7 and a medium magenta ink with the formulation used in Example 6. A fourth set of the Hi-Res combination is identical to the third set of the Hi-Res combination. Thus, the Hi-Res combination includes two replicates of the same dark cyan ink, two replicates of the same dark magenta ink, two replicates of the same dark yellow ink, two replicates of the same dark black ink, two replicates of the same medium cyan ink, and two replicates of the same medium magenta ink for a total of twelve inks representing four different colors with two of the different colored inks being present at two different concentrations of pigment.

The Hi-Res combination of inks exhibits outstanding performance when printed using the DISPLAYMAKER® Series XII large format ink jet printer that is available from ColorSpan Corporation, Inc. One benefit of the Hi-Res combination is provision of a large volume of high quality pigmented inks capable of supporting longer six color process printing runs. Another benefit of the Hi-Res combination, that is believed to derive from the highly transparent inks incorporated in the Hi-Res combination, is the wide color gamut attainable by the Hi-Res combination. Yet another benefit of the Hi-Res combination is the repeatability in visual observed color of printed images of the Hi-Res inks, no matter whether the Hi-Res inks are printed on different substrates, are printed at widely varying times, and/or originate as different batches of the same ink, for a particular color ink of the Hi-Res combination.

Still another particular combination (or set) of interest, that is nicknamed the "Film Quality" combination, includes eight inks as one set of four different colors and two additional sets that each include inks with different concentrations of two of the ink colors (pigment) used in the first ink set. In the Film Quality combination, a first set includes a dark cyan ink with the formulation used in Example 3, a dark magenta ink with the formulation used in Example 2, a dark yellow ink with the formulation used in Example 1, and a dark black ink with the formulation used in Example 4. A second set of the Film Quality combination includes a medium cyan ink with the formulation used in Example 7 and a medium magenta ink with the formulation used in Example 6. A third set of the Film Quality combination includes a medium cyan ink with the formulation used in Example 7 and a medium magenta ink with the formulation used in Example 6. Thus, the Film Quality combination includes one replicate of the dark cyan ink, one replicate of the dark magenta ink, one replicate of the dark yellow ink, one replicate of the dark black ink, one replicate of the medium cyan ink, one replicate of the medium magenta ink, one replicate of the light cyan ink, and one replicate of the light magenta ink for a total of eight inks representing four different colors with two of the different colored inks being present at three different concentrations of pigment.

The Film Quality combination of inks exhibits outstanding performance when printed using the DISPLAYMAKER® Series XII large format ink jet printer that is available from ColorSpan Corporation, Inc. One benefit of the Film Quality combination, that is believed to derive from the highly transparent inks incorporated in the Film Quality combination, is the wide color gamut attainable by the Film Quality combination. Yet another benefit of the Film Quality combination is the repeatability in visual observed color of printed images of the Film Quality inks, no matter whether the Film Quality inks are printed on different substrates, are printed at widely varying times, and/or originate as different batches of the same ink, for a particular color ink of the Film Quality combination.

The pigmented inks of the present invention may be combined in various combinations to create additional sets of pigmented inks that will be capable of attaining a particular gamut of color that is capable of satisfying the printing requirements for a particular printing job. Additionally, any combination of different colored pigmented inks of the present invention will typically cost far less than a corresponding color combination of different prior art pigmented inks.

The reason why inks are included in some of the ink combinations, or sets, of the present invention in different concentrations of the same pigment concerns the resolution power of the human eye for particular colors. As is well known, the resolution power of the human eye varies, sometimes substantially, between different colors. When the resolution of the eye for a particular color is relatively high, a dot of that color is more easily recognized by the eye. Colors with high resolution which are readily recognized by the eye are preferably present in ink sets of the present invention in a plurality of different concentrations of the same pigment. Otherwise, lighter tones inks of the same color would be unattainable and expansion of the color gamut attainable using different concentrations of the inks of a particular ink set would be unnecessarily limited. The lower pigment concentration, lighter tone versions of the inks having high resolution colors permit expansion of the gamut of different colors attainable by the particular ink set that could not be reached if the ink having high resolution color were included in the ink set at only a single pigment concentration.

As an example, in one of the ink sets of the present invention, where the ink set includes cyan ink, magenta ink, yellow ink, and black ink, the cyan ink and the magenta ink are each preferably present in a plurality of different pigment concentrations, whereas the yellow ink and the black ink are optionally present only in a single pigment concentration. The reason for this is that the resolution power of the human eye is quite high for cyan ink and magenta ink. On the other hand, the resolution power of the human eye is quite low for yellow ink, even at relatively high concentrations of yellow pigment in the yellow ink. Accordingly, a light tone of yellow ink inherently exists even though the yellow ink is present in only a single concentration of yellow pigment.

The resolution of the human eye is high for black inks. However, only one black ink with a single concentration of black pigment is needed because light tones of black ink may be reproduced by a combination of cyan, magenta, and yellow ink dots. A black ink with a relatively high concentration of black pigment is included in the ink set, despite the fact that a combination of cyan, magenta, and yellow ink dots reproduces a light tone of black ink, because combination of magenta ink dots and cyan ink dots containing relatively high concentrations of pigment, together with yellow ink dots, does not accurately reproduce the true black color that is attainable when using a high concentration of black pigment in a black ink.

When it is desired to use a plurality of different concentrations of a single pigment in forming different inks of the same color, such as magenta or cyan inks, selection of the number of different pigment concentrations to use requires balancing of competing factors. When only two inks with different concentrations of the same pigment are used, images printed with the ink set incorporating the two inks with different concentrations of the same pigment require less ink and therefore dry somewhat faster. However, use of only two inks with different concentrations of the same pigment does limit the ability of combinations of the different inks of the ink set to stretch the gamut of colors attainable by the ink set.

On the other hand, when the plurality of inks with different concentrations of the same pigment includes four or more inks with differing concentrations of the same pigment, the inks included in the ink set are able to substantially expand the gamut of colors attainable by combinations of the different inks of the ink set. However, use of a single color ink in four different concentrations of the same pigment causes more ink to be required in forming the image and thereby causes a substantial increase in the amount of time required for the image to dry. Additionally, use of four inks with different concentrations of the same pigment in ink jet printers is believed to unnecessarily complicate the structure and operation of the ink jet printers. This is because it has been found that use of three inks with different concentrations of the same pigment captures a substantial amount of the increase in color gamut that occurs when moving from two inks with different concentrations of the same pigment to four inks with different concentrations of the same pigment. Additionally, selection of three inks with different concentrations of the same pigment, decreases the amount of ink placed on the image, consequently reducing the amount of time required for the image to dry, and also helps in controlling the structural and operational complexity of the ink jet printer that relies on the ink set to produce the image.

PROPERTY DETERMINATION AND CHARACTERIZATION TECHNIQUES

Viscosity

Unless otherwise indicated, all ink viscosities recited herein are based upon the following procedure that uses a Brookfield Model DV-III programmable rheometer equipped with an adaptor for small samples. The Brookfield Model DV-III rheometer is available from Brookfield Engineering Laboratories, Inc. of Stoughton, Mass.

The viscosity (the "Brookfield viscosity") of a particular ink sample is determined with the ink sample at room temperature (about 25° C.). About 5 grams of the particular ink being tested are placed in the small sample adaptor which is positioned within the viscosity measurement cell of the rheometer. An appropriate spindle, identified by a spindle number and selected so that the measured viscosity is within the range of the particular spindle, is positioned within the small sample adaptor within the measurement cell. The Brookfield viscosity is measured while running the selected spindle at a revolution per minute (RPM) rate selected based upon calibration studies conducted at the direction of the inventor. For all viscosity determinations and specifications of this disclosure, Spindle No. 18 is selected and is rotated at about 225 RPM during viscosity determinations, unless otherwise indicated.

Surface Tension

Unless otherwise indicated, all surface tension values recited herein were determined with or are based upon use of the DuNOUY interfacial tensiometer that is available from CSC Scientific Company, Inc. of Fairfax, Va. using the surface tension measurement procedures set forth in the instructions accompanying the DuNOUY interfacial tensiometer. All surface tension values recited herein were determined at or are based upon an ink sample temperature of about 25° C.

Conductivity

Unless otherwise indicated, all liquid conductivity determinations recited herein were determined or are based upon use of a Model No. 01481–61 Conductivity Meter that is available from Cole-Parmer Instrument Co. of Vernon Hills, Ill. using the procedure set forth in the instructions accompanying the Model No. 01481–61 Conductivity Meter. All liquid conductivity values recited herein were determined at or are based upon an ink sample temperature of about 25° C.

pH

Unless otherwise indicated, all pH determinations recited or specified herein are based upon use of the Model No. 059–43–00 Digital Benchtop pH/mV Meter that is available from Cole-Parmer Instrument Co. of Vernon Hills, Ill. using the procedure set forth in the instructions accompanying the Model No. 059–43–00 Digital Benchtop pH/mV Meter. All pH values recited herein were determined at or are based upon an ink sample temperature of about 25° C.

Reflectance Spectra

Unless otherwise indicated, all reflectance spectra recited herein were determined in accordance or are based upon the following procedure that relies on a commercially available spectrodensitometer, the X-Rite 938 Spectrodensitometer that is available from X-Rite, Inc. of Grandville, Mich. Calibration standards supplied by X-Rite, Inc. are used to calibrate the X-Rite 938 Spectrodensitometer. Spectral data obtained by the X-Rite 938 Spectrodensitometer are converted by the spectrodensitometer into various spectral values, including CIELAB L* (lightness), a* (redness/greenness), and b* (yellowness/blueness).

Before the reflectance spectra are evaluated for a particular sample of printed ink, the X-Rite 938 Spectrodensitometer is calibrated to the appropriate calibration standard supplied by X-Rite, Inc. First, the spectrodensitometer is placed on the flat ceramic reflection standard that is supplied by X-Rite, Inc. The reflectance spectra of the reflectance standard are determined after the target window of the spectrodensitometer is centered on the white circle of the reflectance standard and after making sure the spectrodensitometer is flat on and filly located on the ceramic reflection standard. If necessary, appropriate adjustments are made to the spectrodensitometer in accordance with the manufacturer's instructions and the reflectance spectra of the reflectance standard are again determined to ensure spectrodensitometer accuracy.

These reflectance spectra of a particular ink are evaluated using a printed sample of the particular ink that is printed using an ink jet printer. Each of the different images that are sampled to determine the L*, a*, and b* values are allowed to dry for about an hour to an hour and 15 minutes before the L*, a*, and b* values are determined. Before spectral data is obtained, the print sample is heated to make the print sample substantially uniform in thickness. Next, the X-Rite 938 Spectrodensitometer is placed on the print sample with the target window of the spectrodensitometer overlying the print sample and the spectrodensitometer fully located on and flat against the print sample. The spectrodensitometer is programmed to characterize spectral data in terms of L*, a*, and b*. Determination of the L*, a*, and b* values for a particular print sample entail five separate measurements of spectral data at five separate locations on the print sample. Thus, the L*, a*, and b* values are based on the average of 25 separate spectra measurements.

After determining L*, a*, b*, for two inks having different colors or different concentrations of the colorant, $\Delta E^*_{ab}$ may be calculated using the following equation: $\Delta E^*_{ab} = [(\Delta L^*)^2 + (\Delta a^*)^2 + (\Delta b^*)^2]^{0.5}$. The numerical value found by calculating $\Delta E^*_{ab}$ indicates the size of the color difference between the two inks, but does not characterize how the colors of the two inks are different. When $\Delta E^*_{ab}$ is about 5 or less, the differences in color between the two ink samples being compared are typically unable to be visually recognized by people with good eye sight and are consequently considered to visually appear as identical colors.

Although the present invention has been described with reference to preferred embodiments, workers skilled in the art will recognize that changes may be made in form and detail without departing from the spirit and scope of the invention.

What is claimed is:

1. An ink jet ink comprising:
a) water;
b) pigment;
c) water miscible organic solvent;
d) high-boiling water miscible organic solvent;
e) optionally, a biocide; and
f) optionally a photoinitiator;
wherein said ink does not contain ethylene glycol or diethylene glycol;
wherein the concentration of the water miscible organic solvent and the high boiling water miscible organic solvent together is from about 20% to about 50% by weight, based upon the total weight of the ink;
wherein the surface tension of the ink is from 30 to 74 dyne-cm;
wherein the liquid conductivity of the ink is less than about 5 milli-mhos;
wherein the pigment has a nominal particle size of less than about 0.2 microns; and
wherein the ink has a pH of from about 7 to about 10.

2. An ink as claimed in claim 1 wherein the water miscible organic solvent is selected from an alkyl alcohol having one to five carbons, and amide, a cyclic amine, a cyclic ester, a ketone, a ketoalcohol, an ether, an oxyethylene addition dimer, an oxyethylene addition trimer, an oxyethylene addition polymer, an oxypropylene addition dimer, an oxypropylene addition trimer, an oxypropylene addition polymer, an alkylene glycol having an alkylene group of 2 to 6 carbons, a thiodiglycol, a lower alkyl ether of a polyhydric alcohol, a lower dialkyl ether of a polyhydric alcohol, sulfolane, 1,3-dimethyl-2-imidazolidinone, and any of these in any combination.

3. An ink as claimed in claim wherein the water miscible organic solvent is selected from the group consisting of methanol, ethanol, n-propanol, isopropanol, n-butyl alcohol, sec-butyl alcohol, tert-butyl alcohol, isobutanol, n-pentanol, dimethylformamide, dimethylacetamide and combinations of the foregoing, and wherein the high boiling water miscible organic solvent is selected from the group consisting of polyethylene glycol, glycerine, glycol ethers, cyclic amines, and combinations of the foregoing.

4. An ink as claimed in claim 1 wherein the water miscible organic solvent comprises isopropanol and wherein the high boiling water miscible solvent comprises 1-methyl-2-pyrrolidinone.

5. An ink as claimed in claim 1 wherein the water miscible organic solvent is selected from the group consisting of isopropyl alcohol, butyrolactone, dipropylene glycol and mixtures of the foregoing and wherein the high boiling water miscible organic solvent is selected from the group consisting of polyethylene glycol, glycerine, 1-methyl-2-pyrrolidinone, dipropylene glycol methyl ether and combinations of the foregoing.

6. An ink as claimed in claim 1 wherein the concentration of the water miscible organic solvent and the high boiling water miscible organic solvent together is from about 25% about 45%, by weight, based on the total weight of the ink.

7. A method of manufacturing an inkjet ink comprising combining (i) water, (ii) pigment, (iii) water miscible organic solvent and (iv) high-boiling water miscible organic solvent; wherein said ink does not contain ethylene glycol or diethylene glycol; wherein the concentration of the water miscible organic solvent and the high-boiling water miscible organic solvent together is from about 20% to about 50% by weight, based upon the total weight of the ink; wherein the surface tension of the ink is from 30 to 74 dyne-cm; wherein the liquid conductivity of the ink is less than about 5 milli-mhos; wherein the pigment has a nominal particle size of less than about 0.2 microns; wherein the ink has a pH of from about 7 to about 10 and wherein the ink is subjected to ultrasonic mixing using ultrasonic energy.

8. A method as claimed in claim 7 herein the water miscible organic solvent is selected from an alkyl alcohol having one to five carbons, and amide, a cyclic amine, a cyclic ester, a ketone, a ketoalcohol, an ether, an oxyethylene addition dimer, an oxyethylene addition trimer, an oxyethylene addition polymer, an oxypropylene addition dimer, an oxypropylene addition trimer, an oxypropylene addition polymer, an alkylene glycol having an alkylene group of 2 to 6 carbons, a thiodiglycol, a lower alkyl ether of a polyhydric alcohol, a lower dialkyl ether of a polyhydric alcohol, sulfolane, 1,3-dimethyl-2-imidazolidinone, and any of these in any combination.

9. A method as claimed in claim 7 wherein the water miscible organic solvent is selected from the group consisting of methanol, ethanol, n-propanol, isopropanol, n-butyl alcohol, sec-butyl alcohol, tert-butyl alcohol, isobutanol, n-pentanol, dimethylformamide, dimethylacetamide and combinations of the foregoing, and wherein the high boiling water miscible organic solvent is selected from the group consisting of polyethylene glycol, glycerine, glycol ethers, cyclic amines, and combinations of the foregoing.

10. A method as claimed in claim 7 wherein the water miscible organic solvent comprises isopropanol and wherein the high boiling water miscible solvent comprises 1-methyl-2-pyrrolidinone.

11. A method as claimed in claim 7 wherein the water miscible organic solvent is selected from the group consisting of isopropyl alcohol, butyrolactone, dipropylene glycol and mixtures of the foregoing and wherein the high boiling water miscible organic solvent is selected from the group consisting of polyethylene glycol, glycerine, 1-methyl-2-pyrrolidinone, dipropylene glycol methyl ether and combinations of the foregoing.

12. A method as claimed in claim 7 wherein the concentration of the water miscible organic solvent and the high boiling water miscible organic solvent together is from about 25% to about 45%, by weight, based on the total weight of the ink.

13. The method of manufacturing the ink jet ink according to claim 7, wherein said ink further comprises a biocide.

14. The method of manufacturing the ink jet ink according to claim 7, wherein said ink further comprises a photoinitiator.

* * * * *